US006749982B2

(12) United States Patent
Rao et al.

(10) Patent No.: US 6,749,982 B2
(45) Date of Patent: Jun. 15, 2004

(54) IMAGING MEMBER WITH POLYESTER BASE

(75) Inventors: Yuanqiao Rao, Pittsford, NY (US); DeBasis Majumdar, Rochester, NY (US); Robert J. Kress, Rochester, NY (US); David E. Decker, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 5 days.

(21) Appl. No.: 10/259,355

(22) Filed: Sep. 27, 2002

(65) Prior Publication Data

US 2004/0063023 A1 Apr. 1, 2004

(51) Int. Cl.[7] .......................... G03C 1/93; B32B 9/04; B32B 27/00; B32B 9/02; B32B 27/06

(52) U.S. Cl. ...................... 430/201; 430/531; 430/533; 430/534; 430/536; 430/537; 347/105; 428/411.1; 428/473.5; 428/478.2; 428/480; 428/483

(58) Field of Search ................................ 430/531, 533, 430/534, 536, 537, 201; 347/105; 428/411.1, 473.5, 478.2, 480, 483

(56) References Cited

U.S. PATENT DOCUMENTS

| | | | | | |
|---|---|---|---|---|---|
| 3,143,421 | A | | 8/1964 | Nadeau et al. | |
| 3,201,249 | A | | 8/1965 | Pierce et al. | |
| 3,892,575 | A | * | 7/1975 | Watts et al. | 430/533 |
| 4,187,114 | A | * | 2/1980 | Kokelenberg et al. | 430/537 |
| 4,663,216 | A | | 5/1987 | Toyoda et al. | 428/212 |
| 4,689,359 | A | | 8/1987 | Ponticello et al. | |
| 4,695,532 | A | | 9/1987 | Ponticello et al. | 430/533 |
| 5,248,364 | A | | 9/1993 | Liu et al. | 156/244.1 |
| 5,298,192 | A | | 3/1994 | Hattori et al. | 430/533 |
| 5,378,592 | A | | 1/1995 | Nakanishi et al. | 430/533 |
| 5,486,426 | A | | 1/1996 | McGee et al. | 428/516 |
| 5,510,180 | A | | 4/1996 | Liu et al. | 428/332 |
| 5,532,118 | A | | 7/1996 | Bauer et al. | 430/533 |
| 5,569,686 | A | * | 10/1996 | Makati et al. | 523/409 |
| 5,639,589 | A | | 6/1997 | Bauer et al. | 430/532 |
| 5,776,604 | A | | 7/1998 | Lu et al. | 428/343 |
| 5,827,615 | A | | 10/1998 | Touhsaent et al. | 428/463 |
| 5,910,401 | A | | 6/1999 | Anderson et al. | 430/533 |
| 6,013,353 | A | | 1/2000 | Touhsaent | 428/203 |
| 6,232,056 | B1 | | 5/2001 | Aylward et al. | 430/536 |
| 6,514,660 | B1 | * | 2/2003 | Majumdar et al. | 430/201 |

FOREIGN PATENT DOCUMENTS

EP 0 583 787 A2 2/1994

OTHER PUBLICATIONS

USSN 10/0447,874 filed Oct. 29, 2001.

* cited by examiner

*Primary Examiner*—Richard L. Schilling
(74) *Attorney, Agent, or Firm*—Paul A. Leipold

(57) ABSTRACT

An imaging member comprising a polymer sheet, a primer layer contacting said polymer sheet, and an image receiving layer contacting said primer layer; wherein said primer layer comprises: a) polyethyleneimine; and b) latex; wherein the latex has a Tg lower than 25° C. and c) hydrophilic colloid material.

20 Claims, No Drawings

IMAGING MEMBER WITH POLYESTER BASE

CROSS REFERENCE TO RELATED APPLICATION

This application relates to commonly assigned copending application Ser. No. 10/056,520 entitled PRIMER COMPOSITION FOR POLYESTERS filed simultaneously herewith. This copending application is incorporated by reference herein for all that it contains.

FIELD OF THE INVENTION

The present invention relates imaging members having a polymer base, particularly a polyester base, and to a primer layer that improves adhesion of the imaging layer to the polymer base.

BACKGROUND OF THE INVENTION

The use of polymeric bases in imaging members is well known. Typically, the base of the imaging member comprises a hydrophobic polymer, and the image receiving layer (also called the imaging layer) comprises hydrophilic colloids, such as gelatin.

Hydrophilic colloids such as gelatin have many unique and desirable properties that make them especially useful in the preparation of photographic materials. For example, gelatin has high swellability in aqueous media which allows rapid diffusion of compounds in and out of a gelatin-containing photographic layer during film processing. Gelatin is also an excellent dispersing medium for light-sensitive silver halide grains and aqueous gelatin solutions exhibit excellent coating properties and quickly undergo gelation when chilled; all of these properties are critical to the manufacture of photographic films. In the case of inkjet applications, the ability of gelatin containing layers to absorb water and water-based inks has promoted their use in inkjet image receiving media. In addition, crosslinked gelatin layers provide very good physical properties such as resistance to scratch, abrasion, ferrotyping, and blocking.

It is difficult to adhere photographic emulsions to oriented polyester supports, such as polyethylene terephthalate or polyethylene naphthalate. The primer layer must work both with unprocessed and processed film in the dry state, and must also adhere when the film is wet during the development process.

Several adhesion promoting "subbing" materials, such as poly(methyl acrylate-co-vinylidene chloride-co-itaconic acid) and poly(acrylonitrile-co-vinylidene chloride-co-acrylic acid) disclosed in U.S. Pat. Nos. 3,201,249 and 3,143,421, respectively, provide the required adhesion when applied before orientation but are not as effective when applied on oriented polyester support. The effectiveness of these adhesive materials may be enhanced by the use of swelling or attack agents such as resorcinol.

An alternative approach disclosed in U.S. Pat. No. 4,695,532 describes a discharged treated polyester film support having coated directly thereon a crosslinked layer of an aqueous vinyl acrylate copolymer and gelatin mixture. Although this system has good adhesion before processing, the adhesion performance is severely degraded by photographic developing solutions.

U.S. Pat. No. 5,298,192 discloses a subbing layer comprising a dye, a hydrophilic colloid, and a latex, but this layer needs to be applied to an already existing subbing layer coated on the support. Such a two-step coating process is costly and introduces more waste.

U.S. Pat. Nos. 4,695,532 and 4,689,359 describe a discharge treated polyester film support having coated directly thereon a subbing layer comprising a mixture of gelatin and an aqueous vinyl acrylate copolymer having a ratio of gelatin to polymer of between 5:95 to 40:60 and a dry coverage of between 0.11 and 0.55 $g/m^2$. Although this subbing layer has good adhesion before processing, it has been found that adhesion after contact with photographic developing solutions is severely degraded.

U.S. Pat. No 5,639,589 describes a subbing composition comprising a mixture of gelatin and an aqueous vinyl acrylate copolymer described in U.S. Pat. Nos. 4,695,532 and 4,689,359 having a ratio of gelatin to polymer of between 55:45 to 97:3. This subbing layer performs well when poly(ethylene naphthalate) is glow discharge treated, but poor adhesion, especially when the film was in contact with wet processing solution, was found when it was applied to poly(ethylene terephthalate).

EP 0583787 A2 discloses the use of glow discharge treatment to enhance the adhesion of photographic elements. This treatment involves the use of high energy plasma under vacuum which requires specific equipment.

U.S. Pat. No. 5,378,592 discloses the use of a two-layer subbing layer (for photographic materials) wherein the first subbing layer is a layer of polyurethane latex cured with an epoxy compound or a dichloro-s-triazine derivative, and the second subbing layer is a hydrophilic colloid layer comprising gelatin.

U.S. Pat. No. 5,532,118 describes the use of a layer of a self-crosslinking polyurethane as an adhesion promoting material for polyester film support. U.S. Pat. No. 5,910,401 describes a similar use of a gelatin-grafted polyurethane for adhesion promotion.

Use of polyethyleneimine based primer layers on polypropylene substrates is known in the art. For example, U.S. Pat. No. 4,663,216 discloses a polyethyleneimine-primed synthetic paper substrate for allegedly improved ink absorption. U.S. Pat Nos. 5,248,364 and 5,510,180 disclose multi layer laminates containing a layer of a polypropylene material permanently bonded to a polyethyleneimine-primed substrate for packaging. U.S. Pat. No. 5,486,426 discloses use of a polyethyleneimine primer in a cold sealable polyolefin substrate. U.S. Pat. No. 5,776,604 discloses a lithographic printable polypropylene substrate, which is primed with polyethyleneimine. U.S. Pat. Nos. 5,827,615 and 6,013,353 disclose metallized multilayer polypropylene packaging films primed with polyethyleneimine. U.S. Pat. No. 6,232,056 discloses imaging elements with polyethyleneimine fuser layer for backside splice enhancement, particularly heat splicing in high speed photographic printers such Agfa MSP U.S. Ser. No. 10/044,874, filed Oct. 29, 1001now U.S. Pat. No. 6,514,660, describes the use of a mixture of gelatin and polyethyleneimine to form a primer for an image member, which can include photographic paper or films. For a discharge treated poly(ethyelene terephthalate) film, the primer comprising polyethyleneimine and gelatin provide pre-process dry adhesion and wet adhesion. However, the present invention, with its additional use of latex, provides superior post-process dry adhesion over the invention of U.S. Ser. No. 10/044,874, filed Oct. 29, 2001.

There is a critical need to develop imaging members, particularly those with highly hydrophobic supports such as oriented polyesters, with image receiving layers that exhibit good pre-process and post-process dry adhesion as well as good wet adhesion to said supports.

SUMMARY OF THE INVENTION

The present invention discloses a novel imaging member that exhibits superior adhesion between the imaging receiving layer and the polymer support.

The present invention discloses the use of a primer layer between the base and the image receiving layer of the element. The primer layer easily adheres to a hydrophobic polymeric sheet that constitutes the base for the imaging member.

The present invention makes it possible to superimpose an imaging layer on the primer layer, without any further surface treatment of the primer layer.

The present invention provides an imaging member comprising a polymer sheet, a primer layer contacting said polymer sheet, and an image receiving layer contacting said primer layer; wherein said primer layer comprises:

a) polyethyleneimine;

b) latex; wherein the latex has a Tg lower than 25 ° C. and c) hydrophilic colloid material.

DETAILED DESCRIPTION OF THE INVENTION

The present invention has numerous advantages. The invention discloses an imaging element that utilizes a novel primer to achieve excellent adhesion of the imaging layer to the polymer imaging support. The support may be a hydrophobic polymeric sheet with desirable mechanical and physical properties but which, by itself, has poor adhesion to the image receiving layer. The excellent adhesion characteristics of the novel primer composition can be realized in both dry and wet states.

The primer layer used in the instant invention comprises polyethyleneimine, a latex and hydrophilic colloid and it can be coated from an aqueous composition, which is environmentally more desirable than solvent based coating compositions.

The other advantage of the invention arises from the fact that the primer layer can be very thin, usually and preferably of sub-micron thickness, which does not necessitate massive drying capability at the support manufacturing site. The primer layer also adds very little to the overall weight and thickness of the imaging support, as compared to a co-extruded adhesion promoting layer. Eliminating a co-extruded layer also makes the manufacturing of the support simpler.

By utilizing primer layers of the invention to increase imaging layer adhesion to polymer layers, imaging layers can contain high levels of plasticizers to improve processing efficiency without the imaging layers separating from the base materials.

These and other advantages of the invention will be clear from the detailed description below.

The polyethyleneimine suitable for use in the primer layer of the invention can be a homopolymer or copolymer of ethyleneimine or mixtures thereof. Also suitable for the invention are polyvinylimines.

Although linear polymers represented by the chemical formula —$[CH_2CH_2NH]$— may be used as the polyethyleneimine, materials having primary, secondary, and tertiary branches can also be used. Commercial polyethyleneimine can be a compound having branches of the ethyleneimine polymer. They are commercially prepared by acid-catalyzed ring opening of ethyleneimine, also known as aziridine. (The latter, ethyleneimine, is prepared through the sulfuric acid esterification of ethanolamine).

Polyethyleneimines can have an average molecular weight of about 100 to about 5,000,000 or even higher. Any polyethyleneimine is suitable for use in the present invention, however the preferred polyethyleneimines have a typical average molecular weight of up to about 3,000,000, preferably from about 200 to about 2,500,000, more preferably from about 300 to about 1,000,000. Polyethyleneimines that are water soluble or dispersible are most preferred.

Polyethyleneimines are commercially available from BASF Corporation under the trade name Lupasol® (also sold as Polymin®). These compounds can be prepared as a wide range of molecular weights and product activities. Examples of commercial PEI's sold by BASF suitable for use in the present invention include, but are not limited to, Lupasol FG®, Lupasol G-35®), Lupasol-P®, Lupasol-PS®, Lupasol-(Water-Free)® and the like.

Polyethyleneimines are also commercially available from Mica corporation as aqueous dispersions. One preferred product, suitable for application in the present invention is Mica A-131-X®.

Polyethyleneimines can be protonated with acids to form a polyethyleneimine salt from the surrounding medium resulting in a product that is partially or fully ionized depending on pH. In general, polyethyleneimines can be purchased as their protonated or unprotonated form with and without water. Either form can be used in the present invention.

It should be noted that linear polyethyleneimines as well as mixtures of linear and branched polyethyleneimines are useful in the compositions of the present invention. Methods for preparing linear polyethyleneimines as well as branched polyethyleneimines are more fully described in Advances in Polymer Science, Vol. 102, pp. 171–188, 1992 (references 6–31) which are incorporated in their entirety herein by reference.

A hydrophilic colloid material for the purpose of this invention can include any water-soluble polymer. A particularly suitable hydrophilic colloid material for application in the primer of the invention is gelatin. Gelatin is well known in the imaging industry, particularly photographic industry. Any of the known types of gelatin, used in imaging elements can be used, as per the invention. These include, for example, alkali-treated gelatin (cattle bone or hide gelatin), acid-treated gelatin (pigskin or bone gelatin), modified gelatins such as those disclosed in U.S. Pat. No. 6,077,655 and references cited therein, gelatin derivatives such as partially phthalated gelatin, acetylated gelatin, and the like, preferably deionized gelatins as well as gelatin grafted onto vinyl polymers, such as those disclosed in U.S. Pat. Nos. 4,855,219; 5,248,558; 5,330,885; 5,952,164; and references therein.

Other hydrophilic colloids that can be utilized in the present invention, either alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamides, polymethacrylamide, poly(N,N-dimethacrylamide), poly(N-isopropylacrylamide), poly (vinylpyrrolidone), poly(vinyl acetate), and the like. Other water soluble polymers suitable for the invention can comprise polyalkylene oxides such as polyethylene oxide, poly 6, (2-ethyloxazolines), polystyrene sulfonate, polysaccharides, or cellulose derivatives such as carboxymethyl cellulose, hydroxyethyl cellulose, and the like.

Most preferred hydrophilic colloids for the primer of the invention include gelatin and poly vinyl alcohol.

The latex polymers of this invention may be prepared by emulsion polymerization, or solution polymerization followed by dispersion of the polymer in water by addition of the organic solution to water containing a surfactant. Polymers prepared by either method, as described in standard textbooks known to those skilled in the art, can be utilized in the primer of the invention.

In latex polymerization the selected monomers are colloidally emulsified in an aqueous medium that usually contains a cationic, nonionic, or zwitterionic surfactant and a polymerization catalyst such as 2,2'-azobis(2-amidinopropane)hydrochloride. The resulting colloidal emulsion is then subjected to conditions conducive to polymerization of the monomeric constituents to produce an aqueous colloidal dispersion commonly called a latex.

Solution polymerization generally involves dissolving the selected monomers in an organic solvent containing a polymerization initiator such as 4,4'-azobis(4-cyanovaleric acid), 2,2'-azobis(2-methylpropionitrile) and 2,2'-azobis(2-amidinopropane)hydrochloride. The solution is maintained under a nitrogen atmosphere and heated at about 60° C. The resulting polymer is then dispersed in water at about 1–5 percent solids. The polymer is then purified by diafiltration.

Useful starting monomers having a primary amine addition salt component include 2-aminoethyl methacrylate hydrochloride, N-(3-aminopropyl) methacrylamide hydrochloride, and p-aminostyrene hydrochloride. Addition salts of other acids can also be used, e.g., hydrobromic, phosphoric, sulfuric, and benzoic acids.

Useful hydrophilic nonionic vinyl monomers include 1-vinylimidazole, 2-methyl-1-vinylimidazole, 2-hydroxyethyl acrylate, 2-hydroxyethyl methacrylate, acrylamide and 2-acetoxyethyl methacrylate.

Useful hydrophobic monomers include vinylidene chloride copolymers, water-soluble polyesters and polyacrylates such as butadiene, butyl acrylate, N-butyl methacrylate, ethyl methacrylate, styrene, and the like. The weight ratio of polyethyleneimine, latex and hydrophilic colloid in the primer layer of the invention can vary according to need. The polyethyleneimine in the primer composition can be from 0.1% to 98%, based on the dry weight of the primer layer; the latex in the primer composition can be from 0.1% to 98%; and hydrophilic colloid in the primer composition can be from 0.1% to 98%, based on the dry weight of the primer layer. It is preferred that polyethyleneimine varies from 1% to 90%, and more preferably from 1% to 25%, based on the dry weight of the primer layer. It is preferred that the latex varies from 1% to 90%, and more preferably from 1% to 25%, based on the dry weight of the primer layer. It is preferred that the hydrophilic colloid is from 1% to 98%, and more preferably from 50% to 98%, based on the dry weight of the primer layer. The dry coverage of the primer layer can vary according to need from 0.1 $mg/m^2$ to 50 $g/m^2$. However, it is preferred to be between 1 $mg/m^2$ and 10 $g/m^2$, and more preferably between 1 $mg/m^2$ and 5 $g/m^2$.

The primer layer of the invention can be formed by any method known in the art. Particularly preferred methods include coating from a suitable coating composition by any well known coating method such as air knife coating, gravure coating, hopper coating, roller coating, spray coating, and the like. The coating composition can be based on water or organic solvent(s) or a mixture of water and organic solvent(s). Alternatively, the primer layer can be formed by thermal processing such as extrusion and co-extrusion with and without stretching, blow molding, injection molding, lamination, etc.

The surface on which the primer layer is formed can be activated for improved adhesion by any of the treatments known in the art, such as acid etching, flame treatment, corona discharge treatment, glow discharge treatment, ultraviolet radiation treatment, ozone treatment, electron beam treatment, etc, or can be coated with any other suitable primer layer. However, corona discharge treatment and flame treatment are the preferred means for surface activation.

In addition to the polyethyleneimine, the latex and hydrophilic colloid, the primer layer of the invention may comprise any other material known in the art. These materials include surfactants, defoamers or coating aids, charge control agents, thickeners or viscosity modifiers, coalescing aids, crosslinking agents or hardeners, soluble and/or solid particle dyes, antifoggants, fillers, matte beads, inorganic or polymeric particles, antistatic or electrically conductive agents, other adhesion promoting agents, bite solvents or chemical etchants, lubricants, plasticizers, antioxidants, voiding agents, colorants or tints, roughening agents, and other addenda that are well-known in the art.

In a preferred embodiment, the primer layer can comprise electrically conductive agents to function as an antistatic layer, and control static charging during manufacturing, finishing and end use of the imaging element. Thus, in this embodiment, the layer of the invention can fulfill the dual purpose of adhesion promotion as well as static control. In this embodiment, any of the electrically conductive agents known in the art for antistatic application can be effectively incorporated in the primer layer of the present invention. These electrically conductive agents can comprise an ionic conductor or an electronic conductor or both.

In ionic conductors, charge is transferred by the bulk diffusion of charged species through an electrolyte. Here the resistivity of the antistatic layer is dependent on temperature and humidity. Antistatic materials containing simple inorganic salts, alkali metal salts of surfactants, ionic conductive polymers, polymeric electrolytes containing alkali metal salts, and colloidal metal oxide sols (stabilized by metal salts), natural or synthetic clays and other siliceous materials, described previously in patent literature, fall in this category and can be incorporated in the present invention. Of particular preference for application in the present invention are those ionic conductors, which are disclosed in U.S. Pat. Nos. 6,077,656; 6,120,979; and references therein.

The conductivity of antistatic layers employing an electronic conductor depends on electronic mobility rather than ionic mobility and is independent of humidity. Antistatic layers containing electronic conductors such as conjugated conducting polymers, conducting carbon particles, crystalline semiconductor particles, amorphous semiconductive fibrils, and continuous semiconducting thin films can be used more effectively than ionic conductors to dissipate static charge since their electrical conductivity is independent of relative humidity and only slightly influenced by ambient temperature. All of these aforementioned electronic conductors can be incorporated in the present invention. Of the various types of electronic conductors, electrically conducting metal-containing particles, such as semiconducting metal oxides, and electronically conductive polymers, such as, substituted or unsubstituted polythiophenes, substituted or unsubstituted polypyrroles, and substituted or unsubstituted polyanilines are particularly effective for the present invention.

Electronically conductive particles which may be used in the present invention include, e.g., conductive crystalline inorganic oxides, conductive metal antimonates, and conductive inorganic non-oxides. Crystalline inorganic oxides may be chosen from zinc oxide, titania, tin oxide, alumina, indium oxide, silica, magnesia, barium oxide, molybdenum oxide, tungsten oxide, and vanadium oxide or composite oxides thereof, as described in, e.g., U.S. Pat. Nos. 4,394,441; 4,416,963; 4,571,361; 4,999,276 and 5,122,445. The conductive crystalline inorganic oxides may contain a "dopant" in the range from 0.01 to 30 mole percent, preferred dopants being aluminum or indium for zinc oxide; niobium or tantalum for titania; and antimony, niobium or halogens for tin oxide. Alternatively, the conductivity can be enhanced by formation of oxygen defects by methods well known in the art. The use of antimony-doped tin oxide at an antimony doping level of at least 8 atom percent and having an X-ray crystallite size less than 100 Å and an average equivalent spherical diameter less than 15 nm but no less than the X-ray crystallite size as taught in U.S. Pat. No. 5,484,694 is specifically contemplated. Particularly useful electronically conductive particles which may be used in the conductive primer layer include acicular doped metal oxides, acicular metal oxide particles, acicular metal oxides containing oxygen deficiencies, acicular doped tin oxide particles, acicular antimony-doped tin oxide particles, acicular niobium-doped titanium dioxide particles, acicular metal nitrides, acicular metal carbides, acicular metal silicides, acicular metal borides, acicular tin-doped indium sesquioxide and the like.

The invention is also applicable where the conductive agent comprises a conductive "amorphous" gel such as vanadium oxide gel comprised of vanadium oxide ribbons or fibers. Such vanadium oxide gels may be prepared by any variety of methods, including but not specifically limited to melt quenching as described in U.S. Pat. No. 4,203,769, ion exchange as described in DE 4,125,758, or hydrolysis of a vanadium oxoalkoxide as claimed in WO 93/24584. The vanadium oxide gel is preferably doped with silver to enhance conductivity. Other methods of preparing vanadium oxide gels which are well known in the literature include reaction of vanadium or vanadium pentoxide with hydrogen peroxide and hydrolysis of $VO_2OAc$ or vanadium oxychloride.

Conductive metal antimonates suitable for use in accordance with the invention include those as disclosed in, e.g., U.S. Pat. Nos. 5,368,995 and 5,457,013. Preferred conductive metal antimonates have a rutile or rutile-related crystallographic structures and may be represented as $M^{+2}Sb^{+5}{}_2O_6$(where $M^{+2}$=$Zn^{+2}$, $Ni^{+2}$, $Mg^{+2}$,$Fe^{+2}$, $Cu^{+2}$, $Mn^{+2}$, $Co^{+2}$) or $M^{+3}Sb^{+5}O_4$(where $M^{+3}$=$In^{+3}$, $Al^{+3}$, $Sc^{+3}$, $Cr^{+3}$, $Fe^{+3}$). Several colloidal conductive metal antimonate dispersions are commercially available from Nissan Chemical Company in the form of aqueous or organic dispersions. Alternatively, U.S. Pat. Nos. 4,169,104 and 4,110,247 teach a method for preparing $M^{+2}Sb^{+5}{}_2O_6$ by treating an aqueous solution of potassium antimonate with an aqueous solution of an appropriate metal salt (e.g., chloride, nitrate, sulfate, etc.) to form a gelatinous precipitate of the corresponding insoluble hydrate which may be converted to a conductive metal antimonate by suitable treatment.

Conductive inorganic non-oxides suitable for use as conductive particles in the present invention include: titanium nitride, titanium boride, titanium carbide, niobium boride, tungsten carbide, lanthanum boride, zirconium boride, molybdenum boride, and the like, as described, e.g., in Japanese Kokai No. 4/55492, published Feb. 24, 1992. Conductive carbon particles, including carbon black and carbon fibrils or nanotubes with single walled or multiwalled morphology can also be used in this invention. Example of such suitable conductive carbon particles can be found in U.S. Pat. No. 5,576,162 and references therein.

Suitable electrically conductive polymers that are preferred for incorporation in the primer layer of the invention are specifically electronically conducting polymers, such as those illustrated in U.S. Pat. Nos. 6,025,119; 6,060,229; 6,077,655; 6,096,491; 6,162,596; 6,187,522; and 6,190,846. These electrically conductive polymers include substituted or unsubstituted aniline-containing polymers (as disclosed in U.S. Pat. Nos. 5,716,550; 5,093,439 and 4,070,189), substituted or unsubstituted thiophene-containing polymers (as disclosed in U.S. Pat. Nos. 5,300,575; 5,354,613; 5,370,981; 5,443,944; and 4,731,408), substituted or unsubstituted pyrrole-containing polymers (as disclosed in U.S. Pat. Nos. 5,665,498 and 5,674,654), and poly(isothianaphthene) or derivatives thereof. These electrically conducting polymer may be soluble or dispersible in organic solvents or water or mixtures thereof. Preferred electrically conducting polymers for the present invention include polypyrrole styrene sulfonate (referred to as polypyrrole/poly (styrene sulfonic acid) in U.S. Pat. No. 5,674,654); 3,4-dialkoxy substituted polypyrrole styrene sulfonate, and 3,4 dialkoxy substituted polythiophene styrene sulfonate. The most preferred substituted electrically conductive polymers include poly(3,4-ethylene dioxypyrrole styrene sulfonate) and poly(3,4-ethylene dioxythiophene styrene sulfonate).

The conductive particles that can be incorporated in the primer layer are not specifically limited in particle size or shape. The particle shape may range from roughly spherical or equiaxed particles to high aspect ratio particles such as fibers, whiskers or ribbons. Additionally, the conductive materials described above may be coated on a variety of other particles, also not particularly limited in shape or composition. For example the conductive inorganic material may be coated on non-conductive silica, alumina, titania and mica particles, whiskers or fibers.

In another preferred embodiment of the invention, the primer layer of the invention comprises pigments such as colorants or tints, typically used in imaging elements. In display type imaging members, such as photographic paper, the resin layer coated or laminated on the paper base (primarily for waterproofing), also serves as a carrier layer for titanium dioxide and other whitening materials as well as tinting materials. By experience, it has been shown that a bluish tint is necessary as the background for images on paper type bases to obtain a favorable response from customers of these products. It would be desirable if the colorant materials rather than being dispersed throughout the polyethylene layer could be included in a layer of the photographic materials that is not subjected to the rigors of high temperature extrusion, which is the most common way of manufacturing the melt extruded resin layer. In this embodiment of the invention, the tinting materials can be easily incorporated in the coatable form of the primer layer of the invention.

The preferred color of the pigment or pigment combinations used in the invention is blue so that it offsets the native yellowness of the gelatin, yielding a neutral background for the image layers. Suitable pigments used in this invention can be any inorganic or organic, colored materials such as those disclosed in U.S. Pat. No. 6,180,330. The preferred pigments are organic, and are those described in Industrial Organic Pigments: Production, Properties, Applications by W. Herbst and K. Hunger, 1993, Wiley Publishers. These include: Azo Pigments such as monoazo yellow and orange, disazo, naphthol, naphthol reds, azo lakes, benzimidazolone, disazo condensation, metal complex, isoindolinone and isoindoline, Polycyclic Pigments such as phthalocyanine, quinacridone, perylene, perinone, diketopyrrolo pyrrole and thioindigo, and Anthrquinone Pigments such as anthrapyrimidine, flavanthrone, pyranthrone, anthanthrone, dioxazine, triarylcarbodium and quinophthalone. The most preferred pigments are the anthraquinones such as Pigment Blue 60, phthalocyanines such as Pigment Blue 15, 15:1, 15:3, 15:4 and 15:6, and quinacridones such as Pigment Red 122, as listed in NPIRI Raw Materials Data Handbook, Vol. 4, Pigments, 1983, National Printing Research Institute. These pigments have a dye hue sufficient to overcome the native yellowness of the gelatin imaging layer and are easily dispersed in a aqueous solution.

The primer layer of the invention can comprise any number of hardeners or crosslinking agents in any amount known in the art for use in imaging elements. Preferred hardeners include 1,2-bis(vinylsulfonylacetamido)ethane (BVSAE), bis(vinylsulfonyl)methane (BVSM), bis (vinylsulfonylmethyl)ether (BVS ME) and bis (vinylsulfonylethyl)ether (BSEE), 1,3-bis (vinylsulfonylpropane (BVSP), 1,3-bis(vinylsulfonyl)-2-hydroxypropane (BVSHP), 1,1,-bis(vinylsulfonyl) ethylbenzenesulfonate sodium salt, 1,1,1-tris(vinylsulfonyl) ethane (TVSE), tetrakis(vinylsulfonyl)methane, tris (acrylamido)hexahydro-s-triazine, copoly(acrolein-methacrylic acid), glycidyl ethers, acrylamides, dialdehydes, blocked dialdehydes, alpha-diketones, active esters, sulfonate esters, active halogen compounds, s-triazines, diazines, epoxides, formaldehydes, formaldehyde condensation products anhydrides, aziridines, active olefins, blocked active olefins, mixed function hardeners such as halogen-substituted aldehyde acids, vinyl sulfones containing other hardening functional groups, 2,3-dihydroxy-1,4-dioxane (DHD), potassium chrome alum, polymeric hardeners such as polymeric aldehydes, polymeric vinylsulfones, polymeric blocked vinyl sulfones and polymeric active halogens. The hardener can be incorporated in any amount to provide cross-linking not only to the primer layer of the invention but also to any other layer(s) of the imaging element, especially those in contact with the primer layer, for any advantageous effect. For example, BVSM can be added to the primer layer to harden the primer layer as well as the bottom layer of a color negative working silver halide emulsion.

The primer layer of the invention can comprise any number of bite solvents. Bite solvents are typically solvents used for etching or plasticizing the polymer sheet upon which the primer layer is formed. These bite solvents can include any of the volatile aromatic compounds disclosed in U.S. Pat. No. 5,709,984, as “conductivity-increasing” aromatic compounds, comprising an aromatic ring substituted with at least one hydroxy group or a hydroxy substituted substituents group. These compounds include phenol, 4-chloro-3-methyl phenol, 4-chlorophenol, 2-cyanophenol, 2,6-dichlorophenol, 2-ethylphenol, resorcinol, benzyl alcohol, 3-phenyl-1-propanol, 4-methoxyphenol, 1,2-catechol, 2,4 dihydroxytohene, 4-chloro-2-methyl phenol, 2,4-dinitrophenol, 4-chlororesominol, 1-naphthol, 1,3-naphthalenediol and the like. These bite solvents are particularly suitable for polyester based polymer sheets of the invention. Of this group, the most preferred compounds are resorcinol and 4-chloro-3-methyl phenol.

The primer layer of the invention can be formed on any polymer sheet, with particular preference for those, which are known for their application as supports in imaging members. The polymer sheet can comprise homopolymer (s), copolymer(s) and/or mixtures thereof Typical imaging supports comprise cellulose nitrate, cellulose acetate, poly (vinyl acetate), polystyrene, polyolefins including polyolefin ionomers, polyesters including polyester ionomers, polycarbonate, polyamide, polyimide, glass, natural and synthetic paper, resin-coated or laminated paper, voided polymers including polymeric foam, microvoided polymers and microporous materials, or fabric, or any combinations thereof. Preferred polymers are polyesters, polyolefins and polystyrenes, mainly chosen for their desirable physical properties and cost.

Suitable polyolefins include polyethylene, polypropylene, polymethylpentene, polystyrene, polybutylene and mixtures thereof. Polyolefin copolymers, including copolymers of propylene and ethylene such as hexene, butene and octene and mixtures thereof are also useful.

Suitable polyesters include those, which are derived from the condensation of aromatic, cycloaliphatic, and aliphatic diols with aliphatic, aromatic and cycloaliphatic dicarboxylic acids and may be cycloaliphatic, aliphatic or aromatic polyesters. Exemplary of useful cycloaliphatic, aliphatic and aromatic polyesters which can be utilized in the practice of their invention are poly(ethylene terephthalate), poly (cyclohexlenedimethylene), terephthalate) poly(ethylene dodecate), poly(butylene terephthalate), poly(ethylene naphthalate), poly(ethylene(2,7-naphthalate)), poly (methaphenylene isophthalate), poly(glycolic acid), poly (ethylene succinate), poly(ethylene adipate), poly(ethylene sebacate), poly(decamethylene azelate), poly(ethylene sebacate), poly(decamethylene adipate), poly (decamethylene sebacate), poly(dimethylpropiolactone), poly(para-hydroxybenzoate), poly(ethylene oxybenzoate), poly(ethylene isophthalate), poly(tetramethylene terephthalate, poly(hexamethylene terephthalate), poly (decamethylene terephthalate), poly(1,4-cyclohexane dimethylene terephthalate) (trans), poly(ethylene 1,5-naphthalate), poly(ethylene 2,6-naphthalate), poly(1,4-cyclohexylene dimethylene terephthalate) (cis), and poly(1, 4-cyclohexylene dimethylene terephthalate (trans) and copolymers and/or mixtures thereof.

Polyester compounds prepared from the condensation of a diol and an aromatic dicarboxylic acid are preferred for use in this invention. Illustrative of such useful aromatic carboxylic acids are terephthalic acid, isophthalic acid and a o-phthalic acid, 1,3-napthalenedicarboxylic acid, 1,4 napthalenedicarboxylic acid, 2,6-napthalenedicarboxylic acid, 2,7-napthalenedicarboxylic acid, 4,4'-diphenyldicarboxylic acid, 4,4'-diphenysulfphone-dicarboxylic acid, 1,1,3-trimethyl-5-carboxy-3-(p-carboxyphenyl)-idane, diphenyl ether 4,4'-dicarboxylic acid, bis-p(carboxy-phenyl) methane and the like. Of the aforementioned aromatic dicarboxylic acids, those based on a benzene ring (such as terephthalic acid, isophthalic acid, orthophthalic acid) are preferred for use in the practice of this invention. Amongst these preferred acid precursors, terephthalic acid is particularly preferred acid precursor.

Preferred polyesters for use in the practice of this invention include poly(ethylene terephthalate), poly(butylene terephthalate), poly(1,4-cyclohexylene dimethylene terephthalate), poly(ethylene isophthalate), and poly (ethylene naphthalate) and copolymers and/or mixtures thereof. Among these polyesters of choice, poly(ethylene terephthalate) and poly(ethylene naphthalate) which may be modified by small amounts of other monomers, are most preferred.

The polymer sheet can comprise a single layer or multiple layers according to need. The multiplicity of layers may include any number of auxiliary layers such as antistatic layers, backmark retention layers, tie layers or adhesion promoting layers, abrasion resistant layers, curl control layers, cuttable layers, conveyance layers, barrier layers, splice providing layers, UV absorption layers, antihalation layers, optical effect providing layers, waterproofing layers, flavor retaining layers, fragrance providing layers, adhesive layers, imaging layers and the like.

The polymer sheet can be formed by any method known in the art such as those involving extrusion, coextrusion, quenching, orientation, heat setting, lamination, coating and solvent casting. It is preferred that the polymer sheet is an oriented sheet formed by any suitable method known in the art, such as by a flat sheet process or a bubble or tubular process. The flat sheet process involves extruding or coextruding the materials of the sheet through a slit die and rapidly quenching the extruded or coextruded web upon a chilled casting drum so that the polymeric component(s) of the sheet are quenched below their solidification temperature. The quenched sheet is then biaxially oriented by stretching in mutually perpendicular directions at a temperature above the glass transition temperature of the polymer(s). The sheet may be stretched in one direction and then in a second direction or may be simultaneously stretched in both directions. The preferred stretch ratio in any direction is at least 3:1. After the sheet has been stretched, it is heat set by heating to a temperature sufficient to crystallize the polymers while restraining to some degree the sheet against retraction in both directions of stretching.

The polymer sheet may be subjected to any number of coatings and treatments, after extrusion, coextrusion, orientation, etc. or between casting and full orientation, to improve its properties, such as printability, barrier properties, heat-sealability, spliceability, adhesion to other supports and/or imaging layers. Examples of such coatings can be acrylic coatings for printability, polyvinylidene halide for heat seal properties, etc. Examples of such treatments can be flame, plasma and corona discharge treatment, ultraviolet radiation treatment, ozone treatment and electron beam treatment to improve printability and adhesion. Further examples of treatments can be calendaring, embossing and patterning to obtain specific effects on the surface of the web. The polymer sheet can be further incorporated in any other suitable support by lamination, adhesion, cold or heat sealing, extrusion coating, or any other method known in the art.

The polymer sheets most preferred for application in the present invention are the polymeric supports disclosed in U.S. Pat. Nos. 4,042,398; 4,699,874; 5,326,624; 5,466,519; 5,866,282; 5,888,683; 6,020,116; 6,030,759; 6,045,965; 6,071,654; 6,074,788; 6,153,367; and 6,197,486; These supports can comprise natural or synthetic paper, coated or laminated resin layers, voided polymers, specifically microvoided polymers, non-voided polymers, woven polymer fibers, cloth, and various combinations thereof, in mainly image display applications. Other most preferred polymeric supports include those disclosed in U.S. Pat. Nos. 5,138,024; 5,288,601; 5,334,494; 5,360,708; 5,372,925; 5,387,501; 5,556,739; 5,580,709; 6,207,361 in mainly image capture applications.

The primer layer of the invention can be placed on any side of the polymer sheet of the imaging member, e.g., on the top side, or the bottom side, or both sides. However, it is preferred to be placed on the top side of the polymer sheet. The aforementioned top side refers to the image receiving side whereas the bottom side refers to the opposite side of the polymer sheet.

A preferred application of the invention is in imaging members, including those utilizing photographic, electrophotographic, electrostatographic, photothermographic, migration, electrothermographic, dielectric recording, thermal dye transfer, inkjet and other types of imaging. A more preferred application of the invention is in photographic imaging elements, including photographic papers and films. Most preferred application of the invention is in photographic image capture products.

The preferred photographic element is a material that utilizes photosensitive silver halide in the formation of images. In the case of thermal dye transfer or ink jet, the image layer that is coated on the imaging element may be any material that is known in the art such as such as gelatin, pigtnented latex, polyvinyl alcohol, polycarbonate, polyvinyl pyrrolidone, polyalkylene oxide, starch, andmethacrylate. The photographic elements can be single color elements or multicolor elements. Multicolor elements contain image dye-forming units sensitive to each of the three primary regions of the spectrum. Each unit can comprise a single coupler and emulsion layer or multiple coupler and emulsion layers each sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40.degree. C. to 70.degree. C., and maintained for a period of time. The precipitation and spectral and chemical sensitization methods utilized in preparing the emulsions employed in the invention can be those methods known in the art.

Chemical sensitization of the emulsion typically employs sensitizers such as: sulfur-containing compounds, e.g., allyl isothiocyanate, sodium thiosulfate and allyl thiourea; reducing agents, e.g., polyamines and stannous salts; noble metal compounds, e.g., gold, platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating and extrusion coating.

The silver halide emulsions utilized in this invention may be comprised of any halide distribution. Thus, they may be comprised of silver chloride, silver chloroiodide, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride; and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements of the invention may utilize emulsions as described in The Theory of the Photographic Process, Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, orammonia tends to facilitate reduction sensitization.

Examples of reduction sensitizers and environments which may be used during precipitation or spectral/chemical sensitization to reduction sensitize an emulsion include ascorbic acid derivatives; tin compounds; polyamine compounds; and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23,113 (1979). Examples of processes for preparing intentionally reduction sensitized silver halide emulsions are described in EP 0 348934 A1 (Yamashita), EP 0 369491 (Yamashita), EP 0 371388 (Ohashi), EP 0 396424 A1 (Takada), EP 0 404142 A1 (Yamada), and EP 0 435355 A1 (Makino).

The photographic elements of this invention may use emulsions doped with Group VIII metals such as iridium, rhodium, osmium, and iron as described in Research Disclosure, September 1996, Item 38957, Section I, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element of the invention comprises the invention laminated support bearing a cyan dye image-forming unit comprising at least one red-sensitive silver halide emulsion layer having associated therewith at least one cyan dye-forming coupler, a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black and white photographic print elements.

The photographic elements may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 μm.

In the following Table 1, reference will be made to (1) Research Disclosure, December 1978, Item 17643, (2) Research Disclosure, December 1989, Item 308119, and (3) Research Disclosure, September 1996, Item 38957, all published by Kenneth Mason Publications, Ltd., Dudley Annex, 12a North Street, Emsworth, Hampshire PO10 7DQ, ENGLAND. The table and the references cited in the table are to be read as describing particular components suitable for use in the elements of the invention. The table and its cited references also describe suitable ways of preparing, exposing, processing and manipulating the elements, and the images contained therein.

TABLE 1

| Reference | Section | Subject Matter |
|---|---|---|
| 1 | I, II | Grain composition, |
| 2 | I, II, IX, X, XI, | morphology and preparation. |
| | XII, XIV, XV | Emulsion preparation |
| | I, II, III, IX | including hardeners, coating |
| 3 | A & B | aids, addenda, etc. |
| 1 | III, IV | Chemical sensitization and |
| 2 | III, IV | spectral sensitization/ |
| 3 | IV, V | desensitization |
| 1 | V | UV dyes, optical brighteners, |
| 2 | V | luminescent dyes |
| 3 | VI | |
| 1 | VI | |
| 2 | VI | Antifoggants and stabilizers |
| 3 | VII | |
| 1 | VIII | Absorbing and scattering |
| 2 | VIII, XIII, XVI | materials; Antistatic layers; |
| 3 | VIII, IX C & D | matting agents |
| 1 | VII | Image-couplers and image- |
| 2 | VII | modifying couplers; Dye |
| 3 | X | stabilizers and hue modifiers |
| 1 | XVII | |
| 2 | XVII | Supports |
| 3 | XV | |
| 3 | XI | Specific layer arrangements |
| 3 | XII, XIII | Negative working emulsions; |
| | | Direct positive emulsions |
| 2 | XVIII | Exposure |
| 3 | XVI | |

TABLE 1-continued

| Reference | Section | Subject Matter |
|---|---|---|
| 1 | XIX, XX | Chemical processing; |
| 2 | XIX, XX, XXII | Developing agents |
| 3 | XVIII, XIX, XX | |
| 3 | XIV | Scanning and digital processing procedures |

The photographic elements can be exposed with various forms of energy which encompass the ultraviolet, visible, and infrared regions of the electromagnetic spectrum as well as with electron beam, beta radiation, gamma radiation, x-ray, alpha particle, neutron radiation, and other forms of corpuscular and wave-like radiant energy in either noncoherent (random phase) forms or coherent (in phase) forms, as produced by lasers. When the photographic elements are intended to be exposed by x-rays, they can include features found in conventional radiographic elements.

The photographic elements are preferably exposed to actinic radiation, typically in the visible region of the spectrum, to form a latent image, and then processed to form a visible image, preferably by other than heat treatment. Processing is preferably carried out in the known RA-4® (Eastman Kodak Company) Process or other processing systems suitable for developing high chloride emulsions.

The following examples illustrate the practice of this invention. They are not intended to be exhaustive of all possible variations of the invention. Parts and percentages are by weight unless otherwise indicated.

EXAMPLES

Materials

The polyethyleneimine used in the primer layer in the following samples is a commercially available aqueous dispersion, supplied by Mica corporation as Mica A-131-X®.

The hydrophilic colloid used in the primer layer in the following samples is deionized gelatin.

Latex-1 comprises poly(ethyl acrylate-co-styrene-co-2-(methylacryloyloxyethyl)trimethylammonium methosulfate) in 75/20/5 wt %. The Tg of this polymer is 12° C. and the particle size is 0.030 microns (30 nanometers).

Latex-2 comprises poly(n-butyl acrylate-co-2-amino ethyl methacrylate hydrochloride-co-2-hydroxymethyl methacrylate) in 50/5/45 mol %. The Tg of this polymer is −16° C. (one phase) and the particle size is 80 nanometers.

Latex-3 is DL 239NA, provided by Dow Chemical (Midland, Mich.), and comprises an aqueous dispersion of a modified carboxylated styrene butadiene polymer, with a Tg of −8° C. and particle size of 190 nanometers.

Latex-4, (Po18016) comprises poly (butyl acrylate-co-styrene-co-methacrylamide-co-2-acrylamido-2-methylpropane sulfonic acid, sodium salt) 59/25/8/8 wt %. The Tg of this polymer is −2° C. and particle size is 80 nm.

Photographic elements are prepared by coating the following layers in order on a 4 mil (101.6 μm) biaxially oriented and corona discharge treated polyester support.

Layer Arrangement

Layer 1) is the primer layer coated from an aqueous coating solution, comprising 0.1% (by wt of total solution mass) of Saponin as surfactant, utilizing a coating hopper. The primer layer is coated directly in contact with corona discharge treated polyester support. The primer layer additionally comprises 2 wt % chrome alum as a cross-linking agent. Details are provided in Table 2.

Layer 2) is an antihalation layer similar to "Layer 2" of Example 1 of U.S. Pat. No. 5,639,589, incorporated herein by reference, coated from a black colloidal silver sol containing a ratio of gelatin to silver of 90.4 to 9.6 and resulted in a dry coverage of 8 g/$m^2$. The antihalation layer is coated directly in contact with the aforementioned primer layer (Layer 1).

Samples coated as such with Layers 1 and 2, are incubated for 24 hours, at 32.2° C. under 50% RH and subsequently evaluated for dry and wet adhesion as described herein below and the results are noted in Table 2. These adhesion tests have been shown to directly correlate with the actual performance of photographic materials as they are handled under common usage conditions. These tests simulate situations to which a photographic material might be exposed to under actual conditions which would disrupt the bond between the subbing layer and the adjacent emulsion layer. The Dry Adhesion Test on processed sample simulates, in a controlled fashion, the removal of splicing tape from a film strip after processing. Splicing tape is commonly used to join separate strips of film to a leader card or to one anothers so as to permit their continuous transport through processing apparatus. The Wet Adhesion Test measures the amount of emulsion which would be removed in a developer solution when a film strip is subjected to a uniform cyclic load. In this test, the scribing of the film with a metal stylus simulates a scratch on the emulsion, which could be formed by any one of a number of sources prior to processing. The load applied to the surface simulates a stuck idler roll or squeegee, which the emulsion side of the film might contact as it moves through processing apparatus.

Pre-process and Post-process Dry Adhesion

Pre-process and post-process dry adhesion is evaluated by tape test (Parallel Groove Adhesion Test) following ASTM D3359, before and after processing of the film sample, respectively, in a C41 processor. A cross-hatch pattern is created by scoring the emulsion surface with a tool. A piece of one inch wide Scotch tape 3M 610 is tightly pressed against the cross-hatch pattern and then quickly peeled away. The sample is then examined for removal of the emulsion and ranked in a scale of 0 to 5, where 0 equals to almost 100 % removal and 5 means no removal. For practical purposes, rankings of 4 and above are considered excellent.

Wet Adhesion Test

A 35mm×5 inch film strip is cut and soaked in developer solution for 3 minutes and 15 seconds at 37.4° C. Then the sample coating is scribed to initiate a crack. After scribing, the sample is secured and a rubber pad with a weight of 900 grams is allowed to abrade the coating for 100 cycles at 60 cycles/min. After abrading, the film is rinsed and dried. The area of coating removed by abrading is assessed and reported as percentage removal.

In the following samples Examples 1–8 and Comparative examples 1–6, primer layers (Layer 1)are coated on polyethylene terephthalate(PET) and subsequently coated with the antihalation layer (Layer 2), same as "Layer 2" of Example 1 of U.S. Pat. No. 5,639,589. Details about these samples and their adhesion performance are listed in Table 3 and 4, respectively.

TABLE 2

| Sample | primer layer composition, Gelatin wt. % | Polyethyleneimine wt. % | Latex wt % | dry primer layer coverage mg/m$^2$ | substrate polymer sheet |
|---|---|---|---|---|---|
| | | | Latex-1 | | |
| Example. 1 | 90 | 5 | 5 | 107.6 | PET |
| Example. 2 | 85 | 5 | 10 | 107.6 | PET |
| Example. 3 | 75 | 5 | 20 | 107.6 | PET |
| | | | Latex-2 | | |
| Example. 4 | 90 | 5 | 5 | 107.6 | PET |
| Example. 5 | 85 | 5 | 10 | 107.6 | PET |
| Example. 6 | 75 | 5 | 20 | 107.6 | PET |
| | | | Latex-3 | | |
| Example. 7 | 90 | 5 | 5 | 107.6 | PET |
| | | | Latex-4 | | |
| Example. 8 | 90 | 5 | 5 | 107.6 | PET |
| Comparative example C-1 | 100 | 0 | | 107.6 | PET |
| Comparative example C-2 | 90 | 10 | | 107.6 | PET |
| | | | Latex-2 | | PET |
| Comparative example C-3 | 90 | | 10 | 107.6 | PET |
| Comparative example C-4 | 85 | | 15 | 107.6 | PET |
| Comparative example C-5 | 80 | | 20 | 107.6 | PET |
| Comparative example C-6 | 75 | | 25 | 107.6 | PET |

TABLE 3

| sample | dry adhesion Preprocessed | post-processed | wet adhesion % removal |
|---|---|---|---|
| Example. 1 | 5 | 5 | 0 |
| Example. 2 | 5 | 5 | 0 |
| Example. 3 | 5 | 5 | 0 |
| Example. 4 | 5 | 5 | 0 |
| Example. 5 | 5 | 5 | 0 |
| Example. 6 | 5 | 5 | 0 |
| Example. 7 | 4 | 4 | 0 |
| Example. 8 | 5 | 4 | 0 |
| Comparative example C-1 | 0 | 0 | 100 |
| Comparative example C-2 | 5 | 2 | 0 |
| Comparative example C-3 | 2 | 2 | 100 |
| Comparative example C-4 | 3 | 1 | 100 |
| Comparative example C-5 | 4 | 2 | 100 |
| Comparative example C-6 | 4 | 1 | 100 |

It is clear that Ex. 1–8, prepared in accordance with the present invention, provide excellent pre-process and post-process dry adhesion and wet adhesion of the emulsion layer to the substrate. It is also clear that these examples Ex. 1–8 provide superior adhesion results relative to the comparative samples Comp. 1–6, wherein at least one of the necessary ingredients of the primer layer of the present invention (namely, polyethyleneimine, gelatin and latex) is withheld from its composition. This demonstrates the necessity of incorporating all three ingredients: polyethyleneimine, low Tg latex and gelatin in the primer layer in order to achieve superior emulsion adhesion, as discovered in the present invention.

In the following samples Examples 9–11 and Comparative examples 7–8, primer layers (Layer 1) are coated on polyethylene naphthalate (PEN) and subsequently coated with the antihalation layer (Layer 2), same as “Layer 2” of Example 1 of U.S. Pat. No. 5,639,589. Details about these samples and their adhesion performance are listed in Table 3 and 4, respectively.

TABLE 4

| Sample | Primer Layer Composition Gelatin wt. % | Polyethylene-imine wt. % | Latex wt. % | dry primer layer coverage mg/m$^2$ | Substrate polymer sheet |
|---|---|---|---|---|---|
| | | | Latex-2 | | |
| Example 9 | 75 | 5 | 20 | 107.6 | PEN |
| | | | Latex-3 | | |
| Example 10 | 85 | 5 | 10 | 107.6 | PEN |
| Example 11 | 75 | 5 | 20 | 107.6 | PEN |
| Comparative example C-7 | 100 | 0 | | 107.6 | PEN |
| | | | Latex-2 | | |
| Comparative example C-8 | 90 | | 10 | 107.6 | PEN |

TABLE 5

| sample | dry adhesion preprocessed | post-processed | wet adhesion % removal |
|---|---|---|---|
| Example. 9 | 4 | 4 | 0 |
| Example. 10 | 4 | 4 | 0 |
| Example. 11 | 4 | 4 | 0 |
| Comparative example C-7 | 0 | 0 | 100 |
| Comparative example C-8 | 2 | 2 | 100 |

It is clear that Ex. 9–11, prepared in accordance with the present invention, provide excellent dry and wet adhesion of the emulsion layer to the substrate. It is also clear that comparative samples, Comp. 7–8, wherein at least one of the necessary ingredients of the primer layer of the present invention (namely, polyethyleneimine, gelatin and latex) is withheld, result in unacceptable performance rating with 100% removal of the emulsion layer during wet adhesion assessment.

What is claimed is:

1. An imaging member comprising a polymer sheet, a primer layer contacting said polymer sheet, and an image receiving layer contacting said primer layer; wherein said primer layer comprises:

a) polyethyleneimine;

b) latex; wherein the latex has a Tg lower than 25° C. and c) a material selected from the group consisting of water-soluble polyvinyl compounds, polyalkylene oxides, cellulose derivatives, dextran, gum arabic, zein, casein, pectin, collagen derivatives, collodion, agar-agar, arrowroot, albumin, polystyrene sulfonate, and polysaccharides.

2. The imaging member of claim 1 wherein the hydrophilic colloid material is gelatin or poly vinyl alcohol.

3. The imaging member of claim 1 wherein the weight ratio of polyethyleneimine is from 0.1% to 98%; the latex is from 0.1% to 98%; and the hydrophilic colloid is from 0.1% to 98%, based on the dry weight of the primer layer.

4. The imaging member of claim 1 wherein the weight ratio of polyethyleneimine is from 1% to 90%; the latex is from 1% to 90%; and hydrophilic colloid is from 1% to 98%, based on the dry weight of the primer layer.

5. The imaging member of claim 1 wherein the weight ratio of polyethyleneimine is from 1% to 25%; the latex is from 1% to 25%; and hydrophilic colloid material is from 50% to 98%, based on the dry weight of the primer layer.

6. The imaging member of claim 1 wherein the weight of the combined polyethyleneimine and latex is from 2% to 25%, based on the dry weight of the primer layer, with the rest being hydrophilic colloid material.

7. The imaging member of claim 1 wherein the polymer sheet comprises polyester.

8. The imaging member of claim 1 wherein the polymer sheet comprises polyethylene terephthalate.

9. The imaging member of claim 1 wherein the polymer sheet comprises polyethylene naphthalate.

10. The imaging member of claim 1 further having an imaging layer wherein the imaging layer comprises gelatin.

11. The imaging member of claim 10 wherein said imaging layer further comprises photosensitive silver halide.

12. The imaging member of claim 10 wherein the imaging layer comprises an inkjet ink receiving layer.

13. The imaging member of claim 10 wherein said imaging layer comprises a thermal dye receiving layer.

14. The imaging member of claim 1 wherein the polyethyleneimine has a molecular weight of between 300 and 1,000,000.

15. The imaging member of claim 1 wherein the primer layer further comprises matte beads.

16. The imaging member of claim 1 wherein the primer layer further comprises a bite solvent.

17. The imaging member of claim 16 wherein said bite solvent comprising resorcinol.

18. A polymer sheet and a primer layer contacting said polymer sheet, wherein said primer layer comprises:

a) polyethyleneimine;

b) latex; wherein the latex has a Tg lower than 25° C. and c) a material selected from the group consisting of water-soluble polyvinyl compounds, polyalkylene oxides, cellulose derivatives, dextran, gum arabic, zein, casein, pectin, collagen derivatives, collodion, agar-agar, arrowroot, albumin, polystyrene sulfonate, and polysaccharides.

19. The imagining member of claim 1 wherein the material recited under c) is selected from polyethylene oxide, carboxymethyl cellulose hydroxyethyl cellulose, polyvinyl alcohol, or poly (vinyl acetate).

20. The polymer sheet of claim 18 wherein the material recited under c) is selected from polyethylene oxide, carboxymethyl cellulose, hydroxyethyl cellulose, polyvinyl alcohol, or poly (vinyl acetate).

* * * * *